United States Patent
Ickes (10) Patent No.: US 11,322,972 B2
(45) Date of Patent: May 3, 2022

(54) SHADE MITIGATION SYSTEMS AND DEVICES

(71) Applicant: John Ickes, Tygh Valley, OR (US)

(72) Inventor: John Ickes, Tygh Valley, OR (US)

( * ) Notice: Subject to any disclaimer, the term of this patent is extended or adjusted under 35 U.S.C. 154(b) by 0 days.

(21) Appl. No.: 17/466,229

(22) Filed: Sep. 3, 2021

(65) Prior Publication Data

US 2022/0103005 A1 Mar. 31, 2022

(51) Int. Cl.
| | |
|---|---|
| H02J 7/35 | (2006.01) |
| H02J 3/38 | (2006.01) |
| H01H 47/32 | (2006.01) |
| H02J 3/00 | (2006.01) |
| H02S 40/30 | (2014.01) |

(52) U.S. Cl.
CPC .............. *H02J 7/35* (2013.01); *H01H 47/325* (2013.01); *H02J 3/0073* (2020.01); *H02J 3/381* (2013.01); *H02S 40/30* (2014.12); *H02J 2300/22* (2020.01); *H02J 2300/24* (2020.01)

(58) Field of Classification Search
CPC .... H02J 7/35; H02J 3/0073; H02J 3/00; H02J 3/381; H02J 3/38; H02J 2300/24; H02J 2300/22; H01H 47/325; H01H 47/32
See application file for complete search history.

(56) References Cited

FOREIGN PATENT DOCUMENTS

| | | | | |
|---|---|---|---|---|
| FR | 2955210 A1 | * | 7/2011 | .............. H02J 3/383 |
| WO | WO-2021206540 A1 | * | 10/2021 | |

* cited by examiner

*Primary Examiner* — Robert L Deberadinis
(74) *Attorney, Agent, or Firm* — Mohr Intellectual Property Law Solutions, PC (57) ABSTRACT

Shade mitigation systems and devices to mitigate adverse effects of shade on a primary photovoltaic cell powering a load via an output terminal. The shade mitigation devices include a relay switch and a secondary photovoltaic cell. The relay switch selectively completes a circuit between the primary photovoltaic cell and the load when energized. The secondary photovoltaic cell is electrically coupled to the relay switch and is mounted in a position to monitor illumination on the primary photovoltaic cell. The secondary photovoltaic cell energizes the relay switch to selectively complete the circuit between the primary photovoltaic cell and the load when the secondary photovoltaic cell is illuminated by at least a threshold illumination. The secondary photovoltaic cell stops energizing the relay switch to selectively open the circuit between the primary photovoltaic cell and the load when the secondary photovoltaic cell is shaded sufficiently to illuminate it below the threshold illumination.

20 Claims, 6 Drawing Sheets

SHADE MITIGATION SYSTEMS AND DEVICES

BACKGROUND

The present disclosure relates generally to photovoltaic systems. In particular, shade mitigation systems and devices for photovoltaic systems are described.

Photovoltaic systems, also referred to as solar power systems, are an important and increasingly viable form of renewable energy. Shade creates issues for photovoltaic systems. For example, shading one portion of a photovoltaic system will reduce the power output of the entire system. Shading just 1 cell out of 36 cells can reduce the power output of the entire system by over 75%.

The shaded portion of the system reduces the electrical current it generates from the photovoltaic effect. The rest of the photovoltaic system will reduce the current of electricity it generates to match the current of the shaded portion if the shaded portion remains electrically connected to the circuit.

Thus, managing how photovoltaic systems operate in the presence of shade, also known as mitigating the adverse effects of shade, is important. Known shade mitigation systems are not entirely satisfactory. For example, existing shade mitigation systems do not satisfactorily selectively disconnect shaded portions of a photovoltaic system from the rest of the system to allow the unshaded portions to operate closer to their full potential. Conventional shade mitigation systems typically introduce taxing parasitic loads on the photovoltaic system and/or require a person to manually monitor the system.

Existing shade mitigation systems rely on inefficient blocking diodes and bypass diodes. Further, conventional systems do not allow photovoltaic systems to daisy-chain together and instead limit them to string arrangements, which reduce their power output. Photovoltaic systems with conventional shade mitigation systems suffer from fade effects and back-feed.

Thus, there exists a need for shade mitigation systems that improve upon and advance the design of known shade mitigation systems. Examples of new and useful shade mitigation devices relevant to the needs existing in the field are discussed below.

United States patent filings with disclosure relevant to shade mitigation systems include the following U.S. patent filings identified by either patent number, publication number, or application number: U.S. Pat. Nos. 9,831,369; 9,799,779; US2013/0321013; U.S. Pat. No. 9,923,516; U.S. Ser. No. 10/439,554; U.S. Pat. No. 9,819,178; U.S. Ser. No. 11/018,623; and U.S. Pat. No. 9,397,612. The complete disclosures of these listed U.S. patent filings are herein incorporated by reference for all purposes.

SUMMARY

The present disclosure is directed to shade mitigation systems and devices to mitigate adverse effects of shade on a primary photovoltaic cell powering a load via an output terminal. The shade mitigation devices include a relay switch and a secondary photovoltaic cell. The relay switch selectively completes a circuit between the primary photovoltaic cell and the load when energized. The secondary photovoltaic cell is electrically coupled to the relay switch and is mounted in a position to monitor illumination on the primary photovoltaic cell. The secondary photovoltaic cell energizes the relay switch to selectively complete the circuit between the primary photovoltaic cell and the load when the secondary photovoltaic cell is illuminated by at least a threshold illumination. The secondary photovoltaic cell stops energizing the relay switch to selectively open the circuit between the primary photovoltaic cell and the load when the secondary photovoltaic cell is shaded sufficiently to illuminate it below the threshold illumination.

DETAILED DESCRIPTION

The disclosed shade mitigation systems and devices will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various shade mitigation systems and devices are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

"Communicatively coupled" means that an electronic device exchanges information with another electronic device, either wirelessly or with a wire-based connector, whether directly or indirectly through a communication network.

"Controllably coupled" means that an electronic device controls operation of another electronic device.

Shade Mitigation Systems and Devices

With reference to the figures, shade mitigation systems and devices will now be described. The shade mitigation systems and devices discussed herein function to selectively disconnect shaded portions of a photovoltaic system from the rest of the system to allow the unshaded portions to operate closer to their full potential.

The reader will appreciate from the figures and description below that the presently disclosed shade mitigation systems and devices address many of the shortcomings of conventional shade mitigation systems and devices. For example, the systems herein selectively disconnect shaded portions of a photovoltaic system from the rest of the photovoltaic system to allow the unshaded portions to operate closer to their full potential. The novel systems described below selectively disconnect shaded portions without introducing a taxing parasitic load on the photovoltaic system and without requiring a person to manually monitor the system.

Further improving over conventional systems, the novel systems described herein do not require energy inefficient blocking and bypass diodes. The novel systems below enable photovoltaic systems to daisy-chain instead of limiting them to string arrangements, which increase the power output potential of them. Photovoltaic systems incorporating the novel shade mitigation systems described below experience reduced or no fade effects and back-feed compared to photovoltaic systems relying on conventional shade mitigation systems and devices.

Contextual Details

Ancillary features relevant to the shade mitigation systems and devices described herein will first be described to provide context and to aid the discussion of the shade mitigation systems and devices.

Primary Photovoltaic Cell

Figure 1:
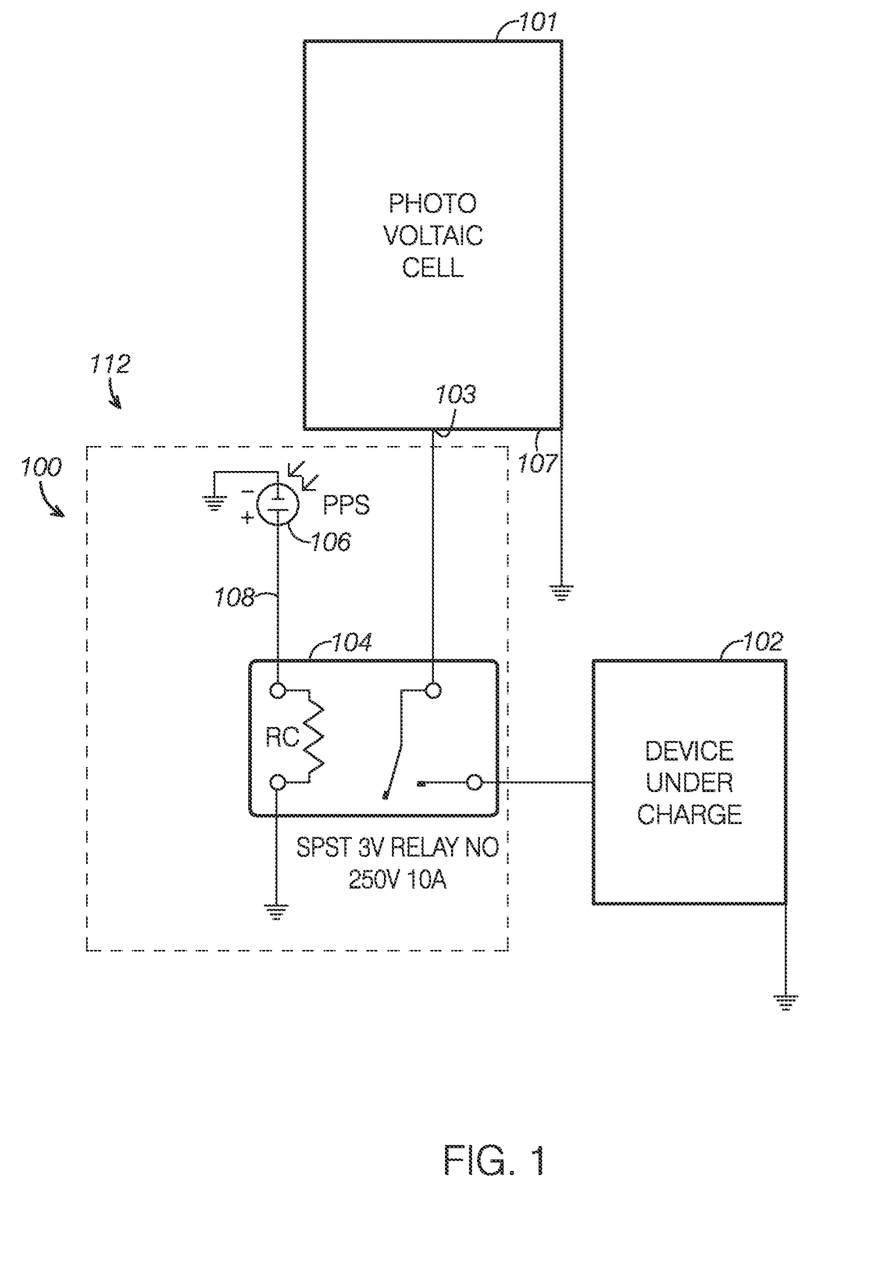
FIG. 1 is a schematic view of a shade mitigation system.
Figure 2:
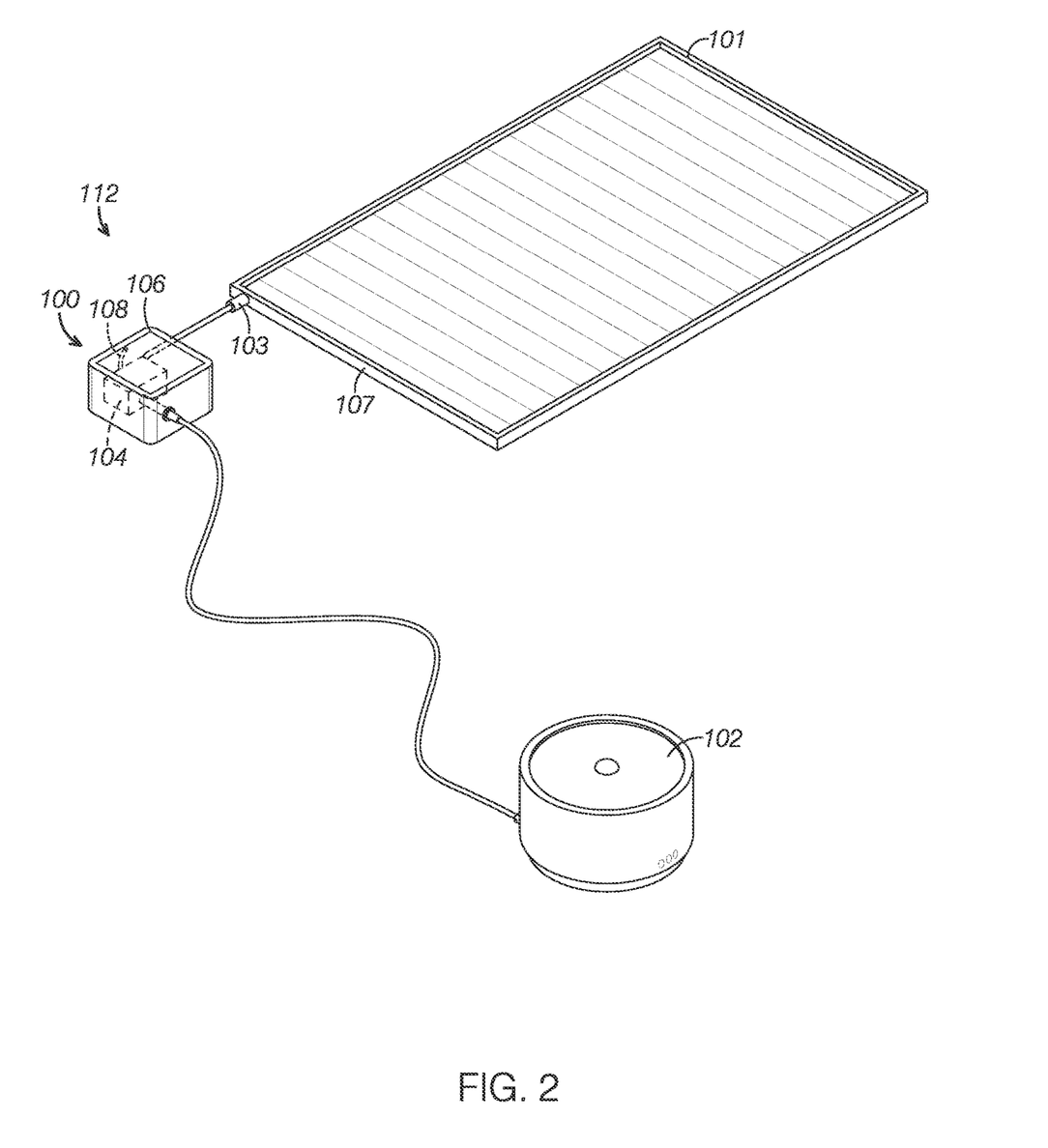
FIG. 2 is a perspective view of a shade mitigation system with a shade mitigation device next to a primary photovoltaic cell.

As shown in FIGS. 1 and 2, primary photovoltaic cell 101 includes an output terminal 103.

The number of primary photovoltaic cells used with the shade mitigation systems may be selected to meet the needs of a given application. The reader should appreciate that the number of primary photovoltaic cells may be different in other examples than is shown in the figures. For instance, some shade mitigation system examples are used with additional or fewer primary photovoltaic cells than described in the present example.

The size and shape of the primary photovoltaic cell may be varied as needed for a given application. In some examples, the primary photovoltaic cell is larger relative to the other components than depicted in the figures. In other examples, the primary photovoltaic cell is smaller relative to the other components than depicted in the figures. Further, the reader should understand that the primary photovoltaic cell and the other components may all be larger or smaller than described herein while maintaining their relative proportions.

The primary photovoltaic cell may be any currently known or later developed type of photovoltaic cell. The reader will appreciate that a variety of photovoltaic cell types exist and could be used in place of the primary photovoltaic cell shown in the figures. In addition to the types of photovoltaic cells existing currently, it is contemplated that the shade mitigation systems described herein could incorporate new types of photovoltaic cells developed in the future.

Shade Mitigation System Embodiment One

With reference to FIGS. 1 and 2, a shade mitigation system 112 will now be described as a first example of a shade mitigation system. The reader can see in FIGS. 1 and 2 that shade mitigation system 112 mitigates adverse effects of shade on a primary photovoltaic cell 101 powering a load 102. As depicted in FIGS. 1 and 2, shade mitigation system 112 includes a shade mitigation device 100 electrically disposed between primary photovoltaic cell 101 and load 102.

Shade Mitigation Device

Shade mitigation device 100 functions to selectively disconnect primary photovoltaic cell 101 from load 102 when primary photovoltaic cell 101 is shaded. As depicted in FIGS. 1 and 2 and described in more detail below, shade mitigation device 100 includes a relay switch 104, a secondary photovoltaic cell 106, and a cable 108. In other examples, the shade mitigation device includes fewer components than depicted in the figures. In certain examples, the shade mitigation device includes additional or alternative components than depicted in the figures.

The number of shade mitigation devices in a shade mitigation system may be selected to meet the needs of a given application. The reader should appreciate that the number of shade mitigation devices may be different in other examples than is shown in the figures. For instance, some shade mitigation system examples include additional or fewer shade mitigation devices than described in the present example.

Relay Switch

The role of relay switch 104 is to selectively connect and disconnect primary photovoltaic cell 101 and load 102. With reference to FIGS. 1 and 2, relay switch 104 is configured to selectively complete a circuit between primary photovoltaic cell 101 and load 102 when relay switch 104 is energized.

As shown in FIGS. 1 and 2, relay switch 104 is a mechanical relay switch. In other examples, the relay switch is a semiconductor integrated circuit, a silicon-controlled rectifier, or a power transistor. The relay switch may be any currently known or later developed type of relay switch. The reader will appreciate that a variety of relay switch types exist and could be used in place of the relay switch shown in the figures. In addition to the types of relay switches existing currently, it is contemplated that the shade mitigation devices described herein could incorporate new types of relay switches developed in the future.

The reader can see in FIGS. 1 and 2 that relay switch 104 cooperating with secondary photovoltaic cell 106 enables primary photovoltaic cell 101 to operate safely without blocking diodes. In the present example and by not relying on blocking diodes, the voltage drop through relay switch 104 is less than 0.7 volts. In the example shown in FIGS. 1 and 2, the contact resistance is 0.030 ohms and the switching current at time of transition is 0.020 mA, which equates to a 0.0006 volts direct current drop across the contacts of the relay switch.

Secondary Photovoltaic Cell

Secondary photovoltaic cell 106 functions to selectively energize relay switch 104 and to detect shade. In particular, secondary photovoltaic cell 106 energizes relay switch 104 sufficiently for relay switch 104 to complete a circuit between primary photovoltaic cell 101 and load 102 when secondary photovoltaic cell 106 is illuminated to a selected extent. Secondary photovoltaic cell 106 de-energizes relay switch 104 (energizes relay switch 104 insufficiently for relay switch 104 to complete a circuit between primary photovoltaic cell 101 and load 102) when secondary photovoltaic cell 106 is shaded to a selected extent.

Expressed another way and with reference to FIGS. 1 and 2, secondary photovoltaic cell 106 energizes relay switch 104 to selectively complete a circuit between primary photovoltaic cell 101 and load 102 when secondary photovoltaic cell 106 is illuminated by at least a threshold illumination. As shown in FIG. 1, secondary photovoltaic cell 106 stops energizing relay switch 104 to selectively open the circuit between primary photovoltaic cell 101 and load 102 when secondary photovoltaic cell 106 is shaded sufficiently to reduce illumination to it below a threshold illumination. The threshold illumination corresponds to the illumination of the sun without a cloud disposed between the sun and secondary photovoltaic cell 106.

With reference to FIGS. 1 and 2, secondary photovoltaic cell 106 is electrically coupled to relay switch 104 and is mounted in a position to monitor illumination on primary photovoltaic cell 101. As depicted in FIGS. 1 and 2, secondary photovoltaic cell 106 is mounted adjacent to primary photovoltaic cell 101. With reference to FIGS. 1 and 2, secondary photovoltaic cell 106 is mounted proximate an edge 107 of primary photovoltaic cell 101.

As shown in FIGS. 1 and 2, secondary photovoltaic cell 106 is smaller than primary photovoltaic cell 101. Secondary photovoltaic cell 106 is selected to have a power output compatible with relay switch 104.

The size and shape of the secondary photovoltaic cell may be varied as needed for a given application. In some examples, the secondary photovoltaic cell is larger relative to the other components than depicted in the figures. In other examples, the secondary photovoltaic cell is smaller relative to the other components than depicted in the figures. Further, the reader should understand that the secondary photovoltaic cell and the other components may all be larger or smaller than described herein while maintaining their relative proportions.

The secondary photovoltaic cell may be any currently known or later developed type of photovoltaic cell. The reader will appreciate that a variety of photovoltaic cell types exist and could be used in place of the secondary photovoltaic cell shown in the figures. In addition to the types of photovoltaic cells existing currently, it is contemplated that the shade mitigation devices described herein could incorporate new types of photovoltaic cells developed in the future.

The number of secondary photovoltaic cells in the shade mitigation device may be selected to meet the needs of a given application. The reader should appreciate that the number of secondary photovoltaic cells may be different in other examples than is shown in the figures. For instance, some shade mitigation device examples include additional or fewer secondary photovoltaic cells than described in the present example.

Cable

With reference to FIGS. 1 and 2, cable 108 electrically connects secondary photovoltaic cell 106 with relay switch 104. The cable may be any currently known or later developed type of cable. In some examples, the shade mitigation device includes a circuit board or photovoltaic cell with electrical traces instead of cables. The reader will appreciate that a variety of cable or trace types exist and could be used in place of the cable shown in the figures. In addition to the types of cables and traces existing currently, it is contemplated that the shade mitigation devices described herein could incorporate new types of cables or traces developed in the future.

The number of cables in the shade mitigation device may be selected to meet the needs of a given application. The reader should appreciate that the number of cables may be different in other examples than is shown in the figures. For instance, some shade mitigation device examples include additional or fewer cables than described in the present example.

The size and shape of the cable may be varied as needed for a given application. In some examples, the cable is larger relative to the other components than depicted in the figures. In other examples, the cable is smaller relative to the other components than depicted in the figures. Further, the reader should understand that the cable and the other components may all be larger or smaller than described herein while maintaining their relative proportions.

Additional Embodiments

With reference to the figures not yet discussed in detail, the discussion will now focus on additional shade mitigation system embodiments. The additional embodiments include many similar or identical features to shade mitigation system 112. Thus, for the sake of brevity, each feature of the additional embodiments below will not be redundantly explained. Rather, key distinctions between the additional embodiments and shade mitigation system 112 will be described in detail and the reader should reference the discussion above for features substantially similar between the different shade mitigation system examples.

Shade Mitigation Device Embodiment Two

Figure 3:
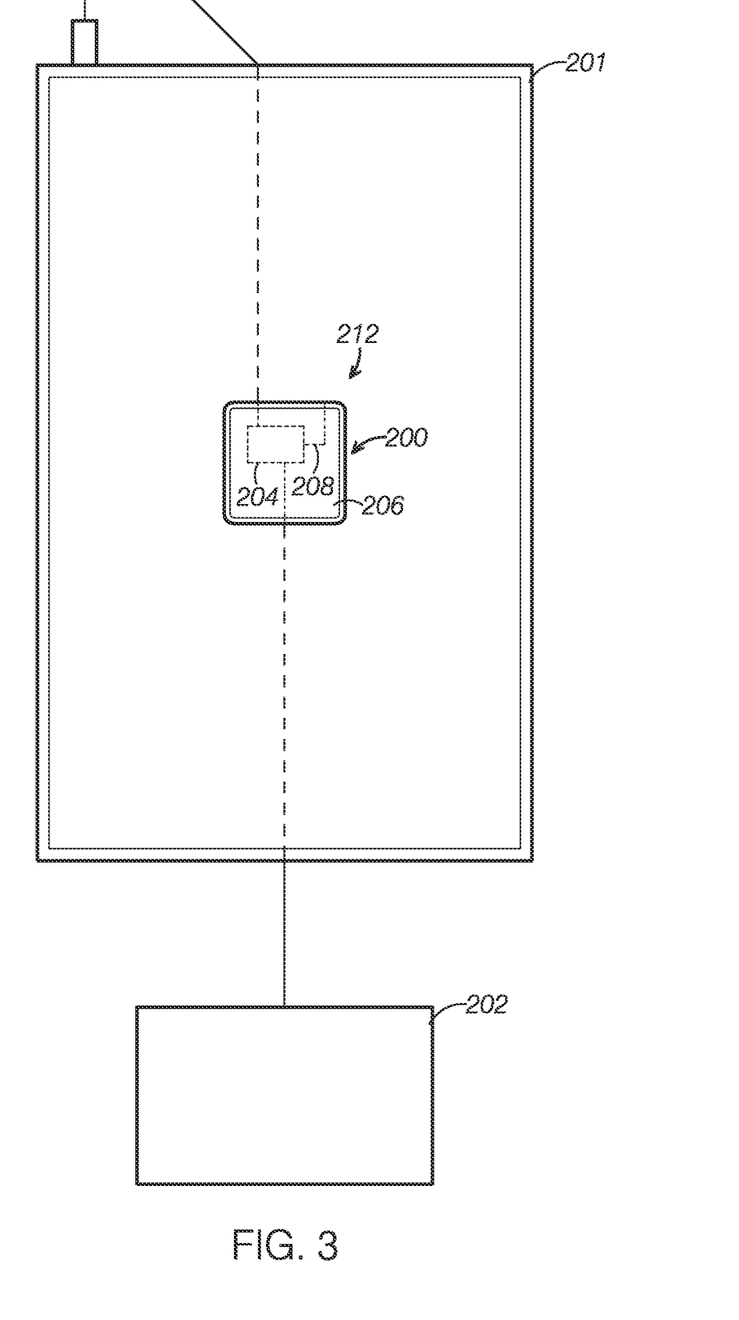
FIG. 3 is a schematic view of a shade mitigation system with a shade mitigation device integrated into a primary photovoltaic cell.

Turning attention to FIG. 3, a shade mitigation system 212 will now be described as a second example of a shade mitigation system. As can be seen in FIG. 3, shade mitigation system 212 includes a shade mitigation device 200.

Shade mitigation device 200 includes a relay switch 204, a secondary photovoltaic cell 206, and a cable 208. In the example shown in FIG. 3, distinct from relay switch 104 discussed above, relay switch 204 is a silicon controlled rectifier. The reader can see in FIG. 3 that secondary photovoltaic cell 206 is integrated into primary photovoltaic cell 201 rather than disposed adjacent to primary photovoltaic cell 101 as with secondary photovoltaic cell 106.

Shade Mitigation System Embodiment Three

Figure 4:
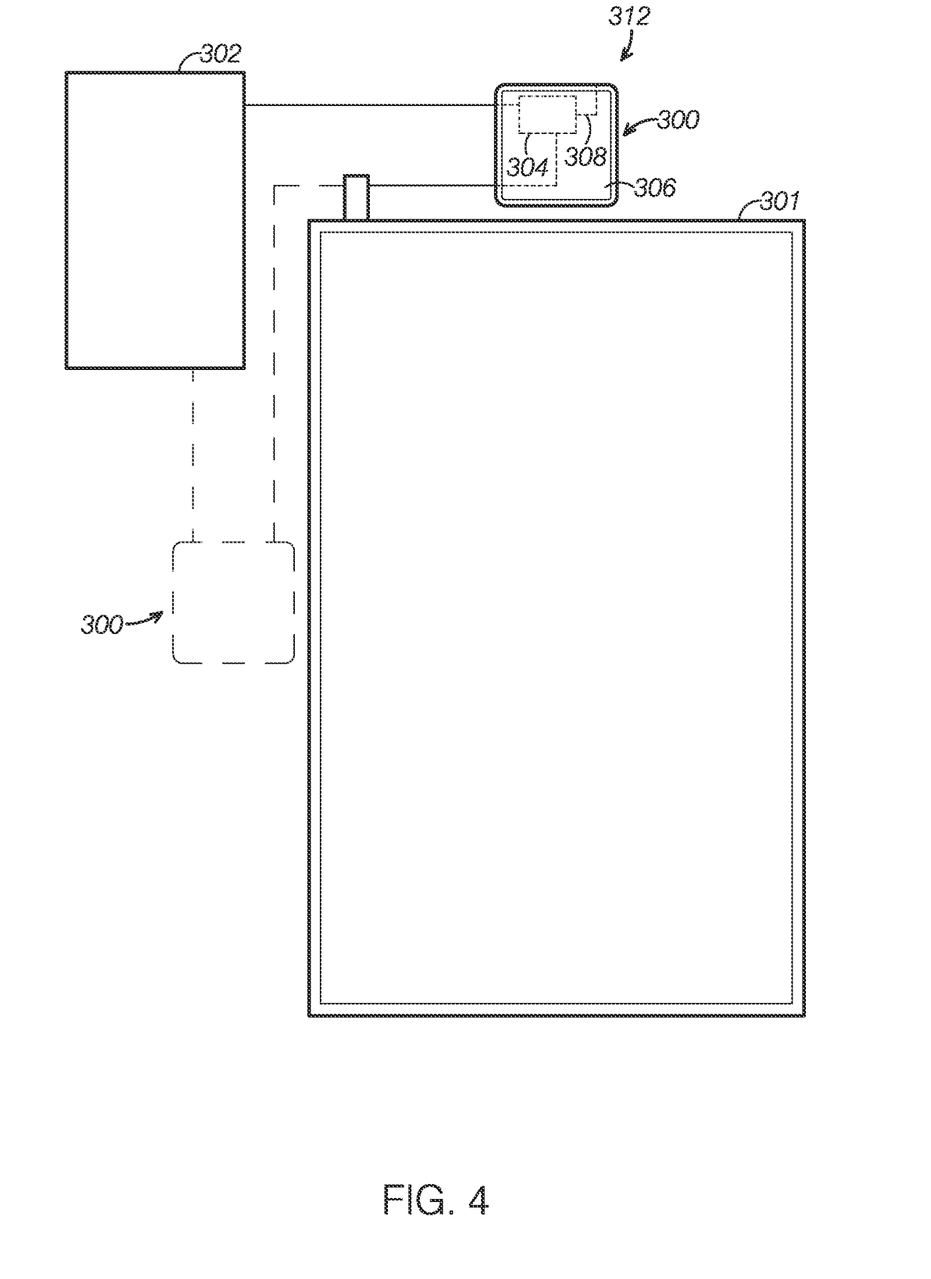
FIG. 4 is a schematic view of a shade mitigation system with a shade mitigation device next to a top edge of a primary photovoltaic cell in solid lines and in an alternate position next to a side edge of the primary photovoltaic cell in dashed lines.

Turning attention to FIG. 4, a shade mitigation system 312 will now be described as a third example of a shade mitigation system. As can be seen in FIG. 4, shade mitigation system 312 includes a shade mitigation device 300.

Shade mitigation device 300 includes a relay switch 304, a secondary photovoltaic cell 306, and a cable 308. In the example shown in FIG. 4, distinct from relay switch 104 discussed above, relay switch 304 is a power transistor. With reference to FIG. 4, the reader can see that secondary photovoltaic cell 306 is configured to move to different positions relative to primary photovoltaic cell 301. Secondary photovoltaic cell 306 being configured to move to different positions enables a user to move secondary photovoltaic cell 306 as needed to most effectively monitor shade on primary photovoltaic cell 301.

Shade Mitigation System Embodiment Four

Figure 5:
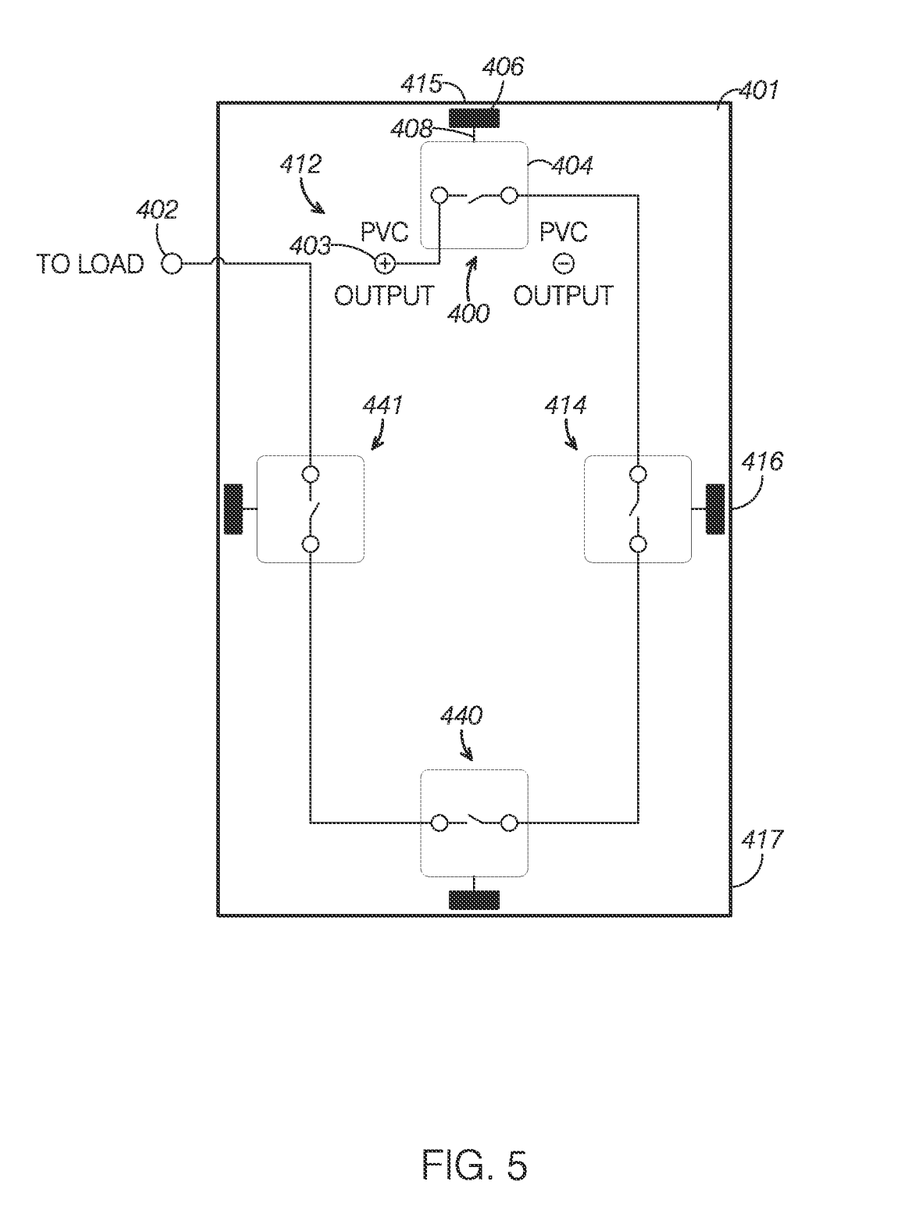
FIG. 5 is a schematic view of a shade mitigation system with four shade mitigation devices and a simple circuit diagram overlying the system to depict that the shade mitigation devices are connected in series.

Turning attention to FIG. 5, a shade mitigation system 412 will now be described as a fourth example of a shade mitigation system. As shown in FIG. 5, shade mitigation system 412 functions to mitigate adverse effects from due on a primary photovoltaic cell 401 powering a load 402.

As can be seen in FIG. 5, shade mitigation system 412 includes a first shade mitigation device 400, a second shade mitigation device 414, a third shade mitigation device 440, and a fourth shade mitigation device 441. In other examples, the shade mitigation system includes fewer components than depicted in FIG. 5. In certain examples, the shade mitigation system includes additional or alternative components than depicted in FIG. 5.

The reader can see in FIG. 5 that shade mitigation device 400 is configured to selectively disconnect the electrical connection between primary photovoltaic cell 401 and load 402 when shade mitigation device 400 is shaded. Likewise, each second shade mitigation device is configured to selectively disconnect the electrical connection between primary photovoltaic cell 401 and load 402 when each shade mitigation device is shaded. Shade mitigation device 400 includes a relay switch 404, a secondary photovoltaic cell 406, and a cable 408. Each shade mitigation device in shade mitigation system 412 is configured the same except that the threshold illumination of shade mitigation device 400 is selected to be different than the threshold illumination of second shade mitigation device 414.

As shown in FIG. 5, shade mitigation device 400, second shade mitigation device 414, third shade mitigation device 440, and fourth shade mitigation device 441 are electrically disposed between output terminal 403 and load 402. As depicted in FIG. 5, shade mitigation device 400, second shade mitigation device 414, third shade mitigation device 440, and fourth shade mitigation device 441 are electrically connected in series.

With reference to FIG. 5, second shade mitigation device 414 is disposed proximate a second portion 416 of primary photovoltaic cell 401 spaced from first portion 415 of primary photovoltaic cell 401. As shown in FIG. 5, first shade mitigation device 413 is disposed proximate a first portion 415 of primary photovoltaic cell 401. As depicted in FIG. 5, third portion 417 of primary photovoltaic cell 401 is spaced from first portion 415 and second portion 416 of primary photovoltaic cell 401. Second shade mitigation device 414 is configured to be selectively moved proximate to third portion 417 of primary photovoltaic cell 401.

Shade Mitigation System Embodiment Five

Figure 6:
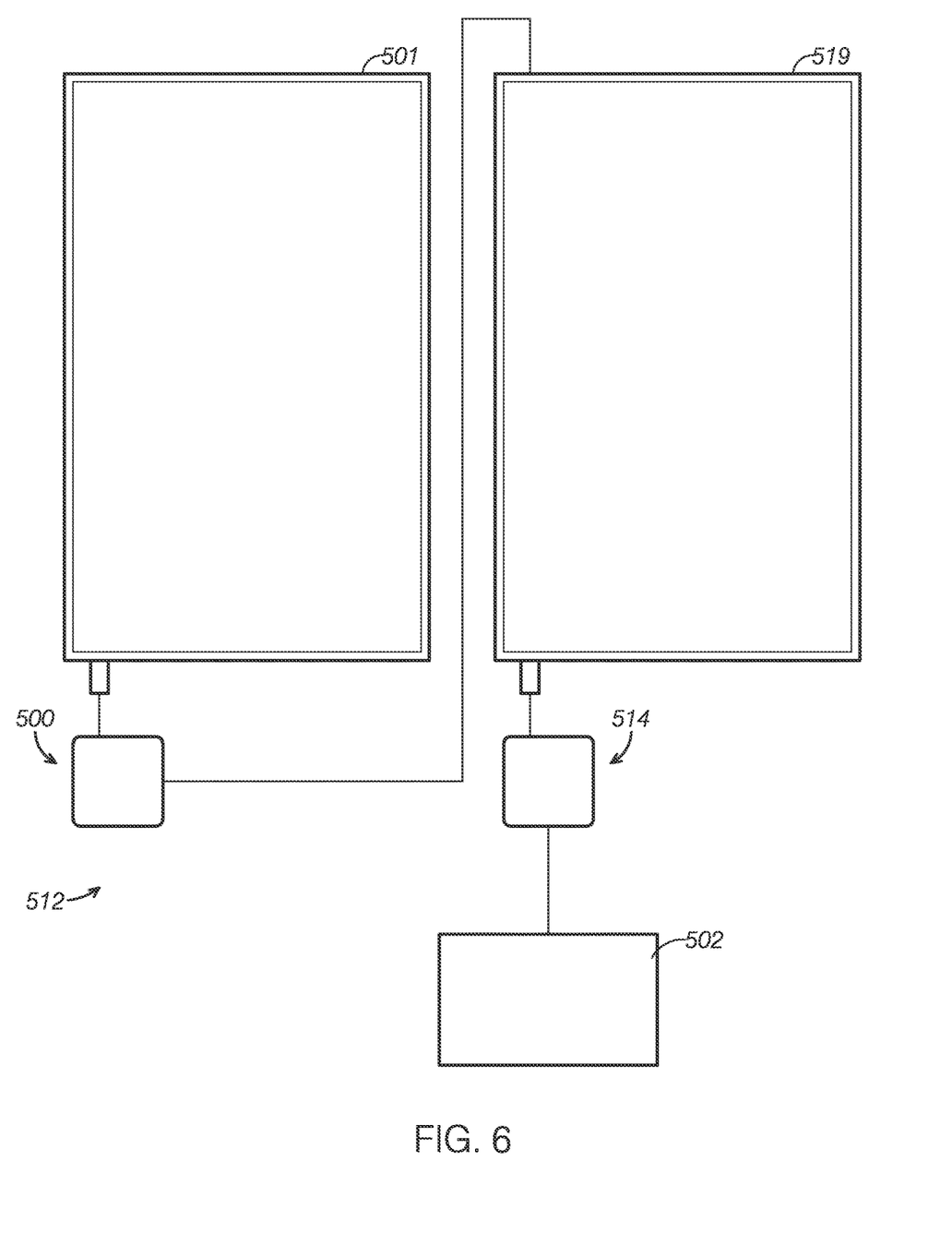
FIG. 6 is a schematic view of a shade mitigation system with two primary photovoltaic cells daisy chained together and shade mitigation devices disposed next to each primary photovoltaic cell.

Turning attention to FIG. 6, a shade mitigation system 512 will now be described as a fifth example of a shade mitigation system. As can be seen in FIG. 6, the shade mitigation system includes a shade mitigation device 500 and a second shade mitigation device 514.

The reader can see in FIG. 6 that shade mitigation device 500 is disposed between first primary photovoltaic cell 501 and second primary photovoltaic cell 519. Second shade mitigation device 514 is disposed between second primary photovoltaic cell 519 and a load 502. As shown in FIG. 6, shade mitigation device 500 enables second primary photovoltaic cell 519 to be electrically daisy chained to first primary photovoltaic cell 501.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A shade mitigation device for a primary photovoltaic cell powering a load, the primary photovoltaic cell including an output terminal, the shade mitigation device comprising:
    a relay switch electrically coupled to the output terminal and to the load, the relay switch configured to selectively complete a circuit between the primary photovoltaic cell and the load when the relay switch is energized; and
    a secondary photovoltaic cell electrically coupled to the relay switch and mounted in a position to monitor illumination on the primary photovoltaic cell;
    wherein the secondary photovoltaic cell energizes the relay switch to selectively complete the circuit between the primary photovoltaic cell and the load when the secondary photovoltaic cell is illuminated by at least a threshold illumination; and
    wherein the secondary photovoltaic cell stops energizing the relay switch to selectively open the circuit between the primary photovoltaic cell and the load when the secondary photovoltaic cell is shaded sufficiently to illuminate it below the threshold illumination.

2. The shade mitigation device of claim 1, wherein the secondary photovoltaic cell is integrated into the primary photovoltaic cell.

3. The shade mitigation device of claim 1, wherein the secondary photovoltaic cell is mounted adjacent to the primary photovoltaic cell.

4. The shade mitigation device of claim 3, wherein the secondary photovoltaic cell is mounted proximate an edge of the primary photovoltaic cell.

5. The shade mitigation device of claim 1, wherein the secondary photovoltaic cell is configured to move to different positions relative to the primary photovoltaic cell.

6. The shade mitigation device of claim 1, further comprising a cable electrically connecting secondary photovoltaic cell with the relay switch.

7. The shade mitigation device of claim 1, wherein the relay switch is a mechanical relay switch.

8. The shade mitigation device of claim 1, wherein the relay switch is a silicon-controlled rectifier.

9. The shade mitigation device of claim 1, wherein the relay switch is a power transistor.

10. The shade mitigation device of claim 1, wherein the secondary photovoltaic cell is smaller than the primary photovoltaic cell.

11. The shade mitigation device of claim 1, wherein the secondary photovoltaic cell is selected to have a power output compatible with the relay switch.

12. The shade mitigation device of claim 1, wherein the threshold illumination corresponds to the illumination of the sun without a cloud disposed between the sun and the secondary photovoltaic cell.

13. The shade mitigation device of claim 1, wherein the relay switch cooperating with the secondary photovoltaic cell enables the primary photovoltaic cell to operate safely without blocking diodes.

14. The shade mitigation device of claim 13, wherein the volt-age drop through the relay switch is less than 0.7 volts.

15. A shade mitigation system for a primary photovoltaic cell powering a load, the primary photovoltaic cell including an output terminal, the shade mitigation system comprising:
   a first shade mitigation device electrically disposed between the output terminal and the load, the first shade mitigation device configured to selectively disconnect the electrical connection between the primary photovoltaic cell and the load when the first shade mitigation device is shaded; and
   a second shade mitigation device electrically disposed between the output terminal and the load, the second shade mitigation device configured to selectively disconnect the electrical connection between the primary photovoltaic cell and the load when the second shade mitigation device is shaded;
   wherein the first shade mitigation device and the second shade mitigation device each include:
      a relay switch configured to selectively complete a circuit between the primary photovoltaic cell and the load when the relay switch is energized; and
      a secondary photovoltaic cell electrically coupled to the relay switch;
      wherein the secondary photovoltaic cell energizes the relay switch to selectively complete the circuit between the primary photovoltaic cell and the load when the secondary photovoltaic cell is illuminated by at least a threshold illumination; and
   wherein the secondary photovoltaic cell stops energizing the relay switch to selectively open the circuit between the primary photovoltaic cell and the load when the secondary photovoltaic cell is shaded sufficiently to illuminate it below the threshold illumination.

16. The shade mitigation system of claim 15, wherein the first shade mitigation device and the second shade mitigation device are electrically connected in series.

17. The shade mitigation system of claim 15, wherein:
   the first shade mitigation device is disposed proximate a first portion of the primary photovoltaic cell; and
   the second shade mitigation device is disposed proximate a second portion of the primary photovoltaic cell spaced from the first portion of the primary photovoltaic cell.

18. The shade mitigation system of claim 15 wherein:
   the second shade mitigation device is configured to be selectively moved proximate a third portion of the primary photovoltaic cell; and
   the third portion of the primary photovoltaic cell is spaced from the first portion and the second portion of the primary photovoltaic cell.

19. The shade mitigation system of claim 15, wherein:
   the primary photovoltaic cell defines a first primary photovoltaic cell; and
   the shade mitigation system further comprises a second primary photovoltaic cell electrically daisy chained to the first primary photovoltaic cell.

20. The shade mitigation system of claim 15, wherein the threshold illumination of the first shade mitigation device is different than the threshold illumination of the second shade mitigation device.

* * * * *